(12) United States Patent
Ramos Carneiro et al.

(10) Patent No.: US 10,186,212 B2
(45) Date of Patent: Jan. 22, 2019

(54) DYNAMIC RESET VOLTAGE FOR AN ELECTROWETTING DISPLAY DEVICE

(71) Applicant: Amazon Technologies, Inc., Seattle, WA (US)

(72) Inventors: Steven Ramos Carneiro, Eindhoven (NL); Pavel Novoselov, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 651 days.

(21) Appl. No.: 14/868,131

(22) Filed: Sep. 28, 2015

(65) Prior Publication Data

US 2017/0092203 A1    Mar. 30, 2017

(51) Int. Cl.
*G09G 3/34* (2006.01)
*G02B 26/00* (2006.01)

(52) U.S. Cl.
CPC ........... *G09G 3/348* (2013.01); *G02B 26/005* (2013.01); *G09G 2310/062* (2013.01); *G09G 2320/0219* (2013.01)

(58) Field of Classification Search
None
See application file for complete search history.

(56) References Cited

U.S. PATENT DOCUMENTS

| 9,459,445 | B1* | 10/2016 | Notermans | .......... G02B 26/005 |
| 9,460,663 | B1 | 10/2016 | Novoselov et al. | |
| 2008/0224983 | A1 | 9/2008 | Lee et al. | |
| 2009/0316253 | A1 | 12/2009 | Fairley et al. | |
| 2010/0231566 | A1 | 9/2010 | Feenstra et al. | |
| 2015/0185579 | A1* | 7/2015 | Koyama | ............. G02F 1/13624 349/39 |
| 2017/0004779 | A1* | 1/2017 | Novoselov | ........... G09G 3/2007 |

OTHER PUBLICATIONS

PCT Search Report and Written Opinion dated Dec. 19, 2016 for PCT Application No. PCT/US16/53560, 12 pages.

* cited by examiner

*Primary Examiner* — Jennifer Mehmood
*Assistant Examiner* — Parul H Gupta
(74) *Attorney, Agent, or Firm* — EIP US LLP (57) ABSTRACT

An electrowetting display device may comprise rows and columns of pixels. Each of the pixels may include a thin film transistor (TFT) that is switchable to select each of the pixels using active matrix addressing. The electrowetting display device may further comprise source lines connected to the TFT of each of the pixels; gate lines connected to the TFT of each of the pixels; and a supplemental capacitor disposed between each of the gate lines and a ground and having a capacitance approximately equal to an equivalent capacitance of a group of pixels that are interconnected with one another on one of the gate lines, wherein the group of pixels are a subset of the rows and columns of pixels.

14 Claims, 6 Drawing Sheets

DYNAMIC RESET VOLTAGE FOR AN ELECTROWETTING DISPLAY DEVICE

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting display includes an array of pixels individually bordered by pixel walls that retain liquid, such as opaque oil, for example. Light throughput through each pixel is adjustable by electronically controlling a position of the liquid in the pixel. Resolution and optical performance of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for operating electronic devices including these components for the electrowetting displays and other features described herein.

In some embodiments, an electrowetting display device includes a first support plate and a second support plate and a plurality of pixels therebetween. Herein, unless otherwise indicated, a viewing side of an electrowetting display is not limited to the side of the display that includes either the first support plate or the second support plate. Individual pixels may include one or more hydrophobic layers or surfaces on the first support plate, a first fluid, and a second fluid at least partially surrounding the first fluid. For example, the first fluid may be an oil and the second fluid may be an electrolyte solution. A hydrophobic layer may comprise a hydrophobic amorphous fluoropolymer (AF1600®), for example. Herein, the term "hydrophobic" is used to describe a material or layer that is hydrophobic relative to other materials or layers. For example, a hydrophobic layer need not be 100% hydrophobic, though the hydrophobicity of the layer may be relatively high. Hydrophobicity of a "hydrophobic material" or "hydrophobic layer" may change under various circumstances or conditions. While each pixel may include a first electrode (e.g., pixel electrode) disposed on the first plate, a second electrode, which may (or may not) be disposed on the second support plate, may overlay a plurality of the pixels. Herein, "disposed on" includes the possibility of intermediate layers (e.g., "disposed on" need not mean "directly on").

The electrowetting display device may also include a control circuit (e.g., "controller") to provide a reset pulse to the plurality of pixels, hereinafter referred to as "pixels", connected to the second electrode layer. In particular, the pixels may be interconnected with one another along a gate line of an array of such pixels (e.g., rows and columns of pixels corresponding to gate lines and source lines of the array). The controller may adjust the amplitude of the reset pulse to modify driving characteristics of the pixels along individual gate lines. Such adjusting may be based, at least in part, on a measured value of voltage across a supplemental capacitor included in the individual gate lines. For example, each gate line may include such a supplemental capacitor. The supplemental capacitor may be fabricated to have a capacitance that at least approximately mimics the capacitive sum (e.g., equivalent capacitance) of all the pixels on the gate line. The capacitance of the pixels may be from parasitic capacitances of structural components of each pixel, such as first and second support plates, thin film transistors (TFTs), and so on, as described in detail below.

Generally, a reset pulse may be applied to the electrowetting pixels to reduce adverse effects on the quality (e.g., brightness, contrast ratio, and so on) of an image displayed by the pixels resulting from electrowetting fluid backflow. For example, such backflow can reduce the stability of a display state during a display period which, for example, is the period during which a desired first display state is to be maintained. Here, the first display state corresponds to a first fluid (e.g., electrowetting oil) being contracted or partially contracted to allow light to transmit through (or reflect from) the electrowetting pixel. Even though a first signal level corresponding to the first display state is applied to the electrowetting element during this period, the contracted or partially contracted first fluid tends to flow back to form a layer over the bottom electrode layer of the pixel, as in the case of an inactive state that prevents light from transmitting through (or reflecting from) the electrowetting pixel. The rate of backflow depends, at least in part, on the properties of the first fluid. Backflow leads to an undesirable change in the display state of the electrowetting pixel and, consequently, a reduced quality of the image of the display device.

The application of a reset pulse during the display period of the first display state resets the electrowetting pixel to counteract backflow. Since the reset pulse may affect the instantaneous display state of an electrowetting pixel, the duration of the reset pulse is relatively short compared to the duration of the first signal level corresponding to the first display state. For example, the reset pulse may have a duration short enough so as to not be noticeable to a viewer of the display device. For a particular example, the duration of a reset pulse may be about 1 millisecond with a duty cycle of about 5%, though claimed subject matter is not so limited.

In a number of embodiments, a display device, such as an electrowetting display device, may be a transmissive, reflective or transflective display that generally includes an array of pixels (e.g., or subpixels) configured to be operated by an active matrix addressing scheme. For example, rows and columns of electrowetting elements are operated by controlling voltage levels on a plurality of source lines and gate lines. In this fashion, the display device may produce an image by selecting particular pixels to transmit, reflect or block light. Pixels may be addressed (e.g., selected) via rows and columns of the source lines and gate lines that are electrically connected to transistors (e.g., used as switches) included in each pixel. Transistors take up a relatively small fraction of the area of each pixel to allow light to efficiently pass through (or reflect from) the pixel. For example, the transistor may be located underneath the reflector in reflective displays. Herein, a pixel (e.g., pixel region) may, unless otherwise specified, comprise a single subpixel or a pixel that includes two or more subpixels of an electrowetting display device. Such a pixel or subpixel may be the smallest light transmissive, reflective or transflective element of a display that is individually operable to directly control an amount of light transmission through and/or reflection from (e.g., throughput) the element. For example, in some implementations, a pixel may be a pixel that includes a red subpixel, a green subpixel, a blue subpixel, and a white pixel (e.g., as in a PenTile® layout). In other implementations, a pixel may be a pixel that is a smallest component, e.g., the pixel does not include any subpixels.

Hereinafter, example embodiments describe reflective or transflective electrowetting displays. The first support plate may be opaque while the second support plate may be transparent. Herein, describing an element or material as being "transparent" means that the element or material may transmit a relatively large fraction of the light incident upon it. For example, a transparent substrate or layer may transmit more than 70% or 80% of the light impinging on its surface, though claimed subject matter is not limited in this respect.

The transparent second support plate may comprise glass or any of a number of transparent materials, such as plastic, quartz, semiconductors, and so on, though claimed subject matter is not limited in this respect. Also, as used herein for sake of convenience of describing example embodiments, the second support plate is that through which viewing of pixels of a (reflective or transflective) electrowetting display occurs. In other embodiments, such orientations and positioning of support plates and other elements of an electrowetting display may be at least partially reversed, such as in the case for a transmissive electrowetting display. Claimed subject matter is not limited in this respect.

Pixel walls retain at least a first fluid which may be electrically non-conductive and/or non-polar, such as opaque or colored oil, in the individual pixels. A cavity formed between the support plates is filled with the first fluid (e.g., the first fluid being retained by pixel walls) and a second fluid (e.g., considered to be an electrolyte solution) that is polar and may or may not be electrically conductive, and may be a water solution, such as a mixture of water and ethyl alcohol, or a salt solution, such as a solution of potassium chloride in water. The second fluid may be transparent, but may be colored, or light-absorbing. The second fluid is at least partially immiscible with the first fluid.

In some embodiments, individual pixels may include a reflective layer on the first support plate of the pixel, a transparent electrode layer adjacent to the reflective layer, and a hydrophobic layer disposed on the electrode layer. In some implementations, an electrode layer may act as a reflective layer. Herein, 'disposed on' includes the possibility of intermediate layers. Pixel walls of each pixel, the hydrophobic layer, and the transparent second support plate at least partially enclose a liquid region that includes an electrolyte solution and a light-absorbing or opaque liquid, which is immiscible with the electrolyte solution. An "opaque" liquid, as described herein, is used to describe a liquid that appears black or colored to an observer. For example, a black opaque liquid strongly absorbs a broad spectrum of wavelengths (e.g., including those of red, green and blue) in the visible region of electromagnetic radiation. In some implementations, the opaque liquid is a nonpolar oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

A spacer grid and edge seals which mechanically connect the support plates, or which form a separation between the support plates, contribute to the mechanical integrity of the electrowetting display. Edge seals, for example, being disposed along a periphery of an array of electrowetting display device pixels, may contribute to retaining (e.g., first and second) fluids between the first support plate and the second overlying support plate.

In some embodiments, a display device as described herein may comprise a portion of a system that includes one or more processors (e.g., controllers) and one or more computer memories, which may reside on a control board, for example. Display software may be stored on the one or more memories and may be operable with the one or more processors to modulate light that is received from an outside source (e.g., ambient light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

Figure 1:
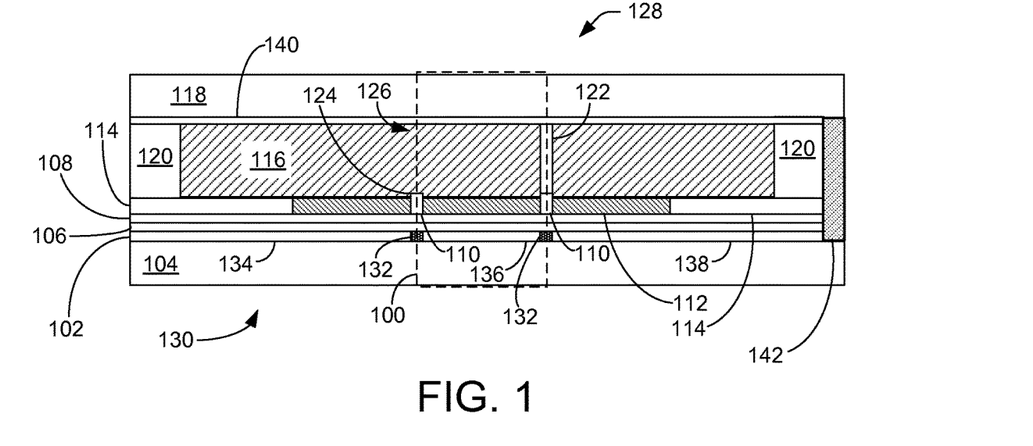
FIG. 1 illustrates a cross-section of a portion of an electrowetting display device, according to some embodiments.

FIG. 1 is a cross-section of a portion of a reflective electrowetting display device illustrating several electrowetting pixels 100, according to some embodiments. Though three such electrowetting pixels are illustrated, an electrowetting display device may include any number (usually a very large number, such as thousands or millions) of electrowetting pixels. An electrode layer 102 is formed on a first support plate 104 and may comprise one or more individual electrodes in each electrowetting pixel.

In various embodiments, electrode layer 102 may be connected to any number of TFTs (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over a supporting (but non-conducting) substrate, which may be glass or any of a number of other transparent or non-transparent materials, for example.

In some implementations, a barrier layer 106 may at least partially separate electrode layer 102 from a hydrophobic layer 108 also formed on first support plate 104. In some implementations, hydrophobic layer 108 may comprise any of a number of types of fluoropolymers, such as AF1600®, produced by DuPont, based in Wilmington, Del. Hydrophobic layer 108 may also be any of a number of water-repelling materials that affect wettability of an adjacent material, for example.

Pixel walls 110 form a patterned electrowetting pixel grid on hydrophobic layer 108. Pixel walls 110 may comprise a photoresist material such as, for example, epoxy-based negative photoresist SU-8. The patterned electrowetting pixel grid comprises rows and columns that form an array of electrowetting pixels. For example, an electrowetting pixel may have a width and length in a range of about 50 to 500 microns. In some implementations, the pixel walls need not be on the hydrophobic layer. For example, pixel walls may be directly on the electrode layer (not illustrated in FIG. 1).

A first fluid 112, which may have a thickness (e.g., depth, height) in a range of about 1 to 10 microns, for example, overlies hydrophobic layer 108. First fluid 112 is partitioned by pixel walls 110 of the patterned electrowetting pixel grid. An outer rim 114 may comprise the same material as pixel walls 110. A second fluid 116, such as an electrolyte solution, overlies first fluid 112 and pixel walls 110 of the patterned electrowetting pixel grid. First fluid 112 is at least partially immiscible with second fluid 116 so that the first fluid and the second fluid do not substantially mix with each other, and in some examples do not mix with each other to any degree. Herein, substances are immiscible with one another if the substances do not substantially form a solution. Second fluid 116 is preferably transparent, but may be colored or absorbing. First fluid 112 is non-polar and may for instance be an alkane like hexadecane or (silicone) oil.

A second support plate 118 covers second fluid 116 and edge seals 120 maintain second fluid 116 over the electrowetting pixel array. Support plate 118 may be supported by edge seals 120 and a spacer grid 122, a portion of which is illustrated in FIG. 1. Spacer grid array 122 may substantially extend over the array of pixels 100. For example, portions of spacer grid 122 extend from tops 124 of pixel walls 110 to second support plate 118. In some implementations, spacer grid 122 need not be in contact with tops 124 of pixel walls 110, and there may be a gap between spacer grid 122 and tops 124. Such a gap, for example, allows second fluid 116 to flow among different pixels 100.

The reflective electrowetting display device has a viewing side 128 on which an image formed by the electrowetting display device may be viewed, and a rear side 130. Second support plate 118 faces viewing side 128 and first support plate 104 faces rear side 130. Also, in a perspective where "top" is the upper portion of FIG. 1 and "bottom" is the lower portion of FIG. 1, a top surface of support plate 104 faces viewing side 128. The electrowetting display device may be an active matrix driven display type or a passive matrix driven display, just to name a few examples.

Separation block 132 represents a discontinuity of electrical conductivity along electrode layer 102. For example, a first portion 134 of electrode layer 102 may be electrically insulated or separated from a second portion 136 and a third portion 138 of electrode layer 102 so that each portion 134, 136, and 138 is connected to a respective pixel. Electrode layer 102 need not extend to edges of the display area of the electrowetting display device, as illustrated in the figure.

In some embodiments, electrowetting pixels may include a second electrode 140 disposed on second support plate 118, one or more color filters (not illustrated), or a black matrix (not illustrated). The electrode on the second support plate may or may not be patterned to form any of a number of circuit configurations, for example.

In some embodiments, a supplemental capacitor 142 may be disposed between conductive entities, such as between electrode layer 102 and second electrode 140, for example. In some implementations, supplemental capacitor 142 may be disposed between a gate line and a source line. Supplemental capacitor 142 may be fabricated in a peripheral region of the electrowetting display device, beyond the array of pixels 100 and between first support plate 104 and second support plate 118.

Hydrophobic layer 108 is arranged on first support plate 104 to create an electrowetting surface area. The hydrophobic character causes first fluid 112 to adhere preferentially to first support plate 104 since first fluid 112 has a higher wettability with respect to the surface of hydrophobic layer 108 than second fluid 116. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

First fluid 112 absorbs at least a part of the optical spectrum. First fluid 112 may be transmissive for a part of the optical spectrum, forming a color filter. For this purpose, the fluid may be colored by addition of pigment particles or dye, for example. Alternatively, first fluid 112 may be colored or black (e.g., absorbing substantially all parts of the optical spectrum) or reflecting. Hydrophobic layer 108 may be transparent, reflective, or colored. A reflective layer may reflect the entire visible spectrum, making the layer appear white, or part of it, making it have a color.

If a voltage is applied across electrowetting pixel 100 (e.g., between electrode layer 102 and second electrode 140), electrowetting pixel 100 will enter into an active state.

Electrostatic forces will move second fluid 116 toward electrode layer 102, thereby displacing first fluid 112 from the area of hydrophobic layer 108 to pixel walls 110 surrounding the area of hydrophobic layer 108, to a droplet-like shape. Such displacing action at least partly uncovers first fluid 112 from the surface of hydrophobic layer 108 of electrowetting pixel 100.

If the voltage across electrowetting pixel 100 is returned to an inactive signal level of zero or a value near to zero, electrowetting pixel 100 will return to an inactive state, where first fluid 112 flows back to cover hydrophobic layer 108. In this way, first fluid 112 forms an electrically controllable optical switch in each electrowetting pixel 100. Of course, such details of an electrowetting display device are merely examples, and claimed subject matter is not limited in this respect.

Figure 2:
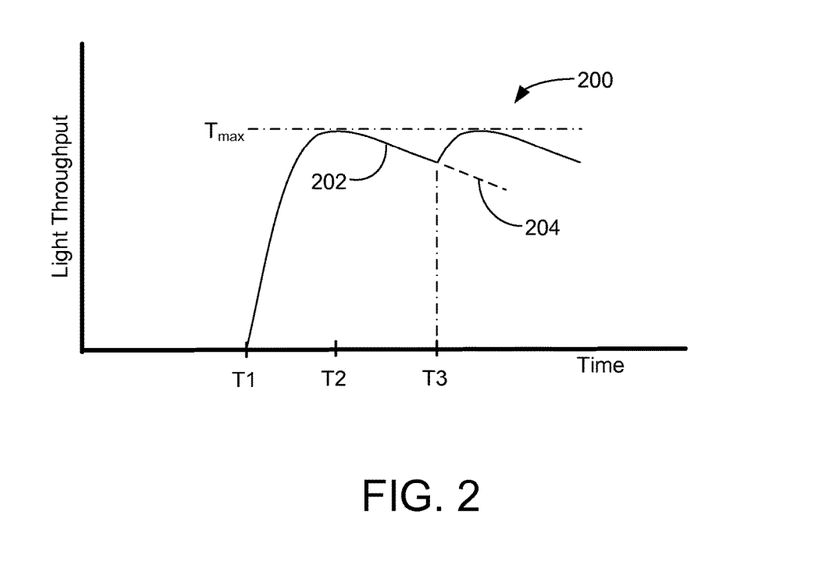
FIG. 2 is a plot of light throughput of an electrowetting pixel as a function of time, according to various embodiments.

FIG. 2 is a plot 200 of light throughput of electrowetting element 100 as a function of time, according to various embodiments. Electrowetting pixel 100 may be incorporated in a transmissive, reflective, or transflective type of electrowetting display, and light throughput describes transmission or reflection, respectively, for such types of electrowetting displays. Here, throughput refers to the amount of light that arrives at hydrophobic layer 108, wherein the light may subsequently be reflected from a layer on the first support plate or the first support plate or may be transmitted through the layers and first support plate 104, for example.

Figure 3:
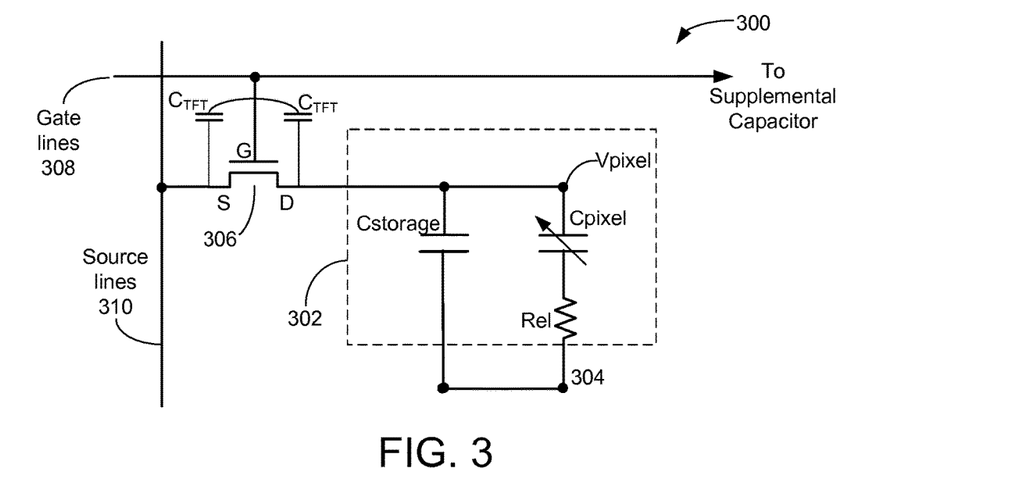
FIG. 3 is a schematic circuit diagram of an electrowetting pixel, according to various embodiments.

Plot 200 demonstrates how backflow of first fluid 112 can affect light throughput through electrowetting pixel 100. In a first display period, before time T1, substantially no voltage is applied between electrode layer 102 and second electrode 140, electrowetting pixel 100 is in an inactive state, and the light throughput is zero. At time T1, a voltage V applied between electrode layer 102 and second electrode 140 is set at a non-zero active signal level so that electrowetting pixel 100 will enter into an active state. For example, voltage V may be the voltage of the drain of a TFT 306, as illustrated in FIG. 3. Electrostatic forces move second fluid 116 toward hydrophobic layer 108 and first fluid 112 is consequently displaced from the area of hydrophobic layer 108 to pixel walls 110 surrounding the area of hydrophobic layer 108, to a droplet-like form. Thus, first fluid 112 uncovers the surface of hydrophobic layer 108 and light throughput rapidly increases to a transmission level $T_{max}$ at time T2.

During or after the application of voltage V, first fluid 112 will gradually flow back to increasingly cover hydrophobic layer 108, thereby reducing light throughput of electrowetting pixel 100. The decrease in light throughput due to backflow is indicated by the down-slope portion 202 in plot 200. Portion 202, and thus light throughput, continues to decrease over time. At time T3, a reset pulse is applied to counteract the effects of backflow. The reset pulse momentarily suspends backflow and induces first fluid motion over the pixel area. After the reset pulse, the data voltage for a corresponding grey scale level can be applied to the pixel for the duration of the display period. Reset pulses are sufficiently short so as not to produce flicker for an observer of the image of the electrowetting display. Subsequently, light throughput may increase back to $T_{max}$.

In contrast, without the reset pulse the transmission of the element would have followed the slanting dashed line 204 in plot 200. With a reset pulse, however, the transmission of the element can return to $T_{max}$. Although effects of a reset pulse are explained with reference to an electrowetting element operating in transmission, a similar explanation can be given for an electrowetting element operating in reflection, whereby the display state of the element is not represented by transmission but by reflection.

In some particular embodiments, the duration of a reset pulse may be in a range from about 0.5 milliseconds up to about 2 milliseconds, and the duration of a display period may be about 20 milliseconds. A reset pulse can reduce effects of backflow to such an extent that an observer need not perceive these effects. As mentioned above, reset pulses are sufficiently short so as not to produce flicker for an observer of the image of the electrowetting display. In some implementations, the reset pulse may be a square pulse, a sawtooth pulse, or a triangular pulse, just to name a few examples.

FIG. 3 is a schematic circuit diagram of a circuit 300 of an electrowetting pixel of a display device, according to various embodiments. Circuit 300 includes a pixel portion 302 that includes the optical portion of electrowetting element 300. Here, referring to the example embodiment illustrated in FIG. 1, for example, such an optical portion includes first and second fluids 112 and 116, and portions of electrode layer 102 and second electrode 140. An electrical representation of the optical portion is illustrated in pixel portion 302. For example, capacitance Cpixel represents a capacitance formed by a multiple dielectric layer stack between two electrodes (e.g., the pixel electrode in electrode layer 102 and second electrode 140) of pixel portion 302. Varying states (e.g., configurations) of fluids 112 and 116 may give rise to a varying capacitance. Cstorage represents a storage capacitor included in pixel portion 302. Rel represents electrical resistance of second fluid 116 (e.g., electrolyte). Vpixel is the voltage of pixel portion 302 with respect to a common voltage "point", such as Vcom 304 (though a portion of the electrowetting element at the common voltage may be an extended region and need not be a point). For example, Vcom 304 may be the same as the second electrode 140. In some implementations, Vpixel is also the voltage of the source of TFT 306, which is used, among other things, to select electrowetting element 300 from an array of rows and columns of such electrowetting elements.

In some embodiments, pixel portion 302 is electrically connected to a reset controller (not illustrated), which may comprise electronic circuitry, code executable by a processor, or a combination thereof. For example, a reset controller may be electrically connected to a top electrode such as second electrode 140 illustrated in FIG. 1. A bottom electrode (e.g., a portion of a TFT on a bottom support plate), such as a portion of electrode layer 102 illustrated in FIG. 1, includes storage capacitor Cstorage. The display device includes rows of gate lines 308 for selecting particular electrowetting elements and columns of source lines 310 for electrically driving the selected electrowetting elements. Gate lines 308 and source lines 310 may comprise conductive traces on a support plate (e.g., first support plate 104). Gate line 308 is electrically connected to the gate of data TFT 306 to select or deselect electrowetting element 300. Source line 310 is electrically connected to the source of TFT 306. The drain of TFT 306 is electrically connected to pixel portion 302. In other implementations, different types of TFTs (e.g., n-type or p-type) may be used so that sources and drains may be reversed in the example descriptions herein. Claimed subject matter is not limited in this respect. Also, embodiments are described herein as having rows and columns of conductive lines (e.g., 308 and 310). However, the descriptions may include a switch between "rows" and "columns" without affecting the nature of such descriptions. Claimed subject matter is not limited in this respect.

In some embodiments, parasitic capacitance $C_{TFT}$ may be formed between the gate and source and between the gate and drain of TFT 306. For example, the TFT of each pixel (e.g., pixel portion 302) on individual gate lines 308 may have such parasitic capacitances. Accordingly, for an individual gate line 308, the parasitic capacitances of all the pixels on the gate line may add to form an equivalent capacitance (e.g., capacitive values of parallel capacitors are additive). In some embodiments, a supplemental capacitor may be fabricated at some point or region along individual gate lines 308. The supplemental capacitor may be fabricated to have a capacitance to be at least approximately equal to the equivalent capacitance of the parasitic capacitances of all the pixels on the individual gate line. In some implementations, each gate line 308 includes such a supplemental capacitor.

Figure 4:
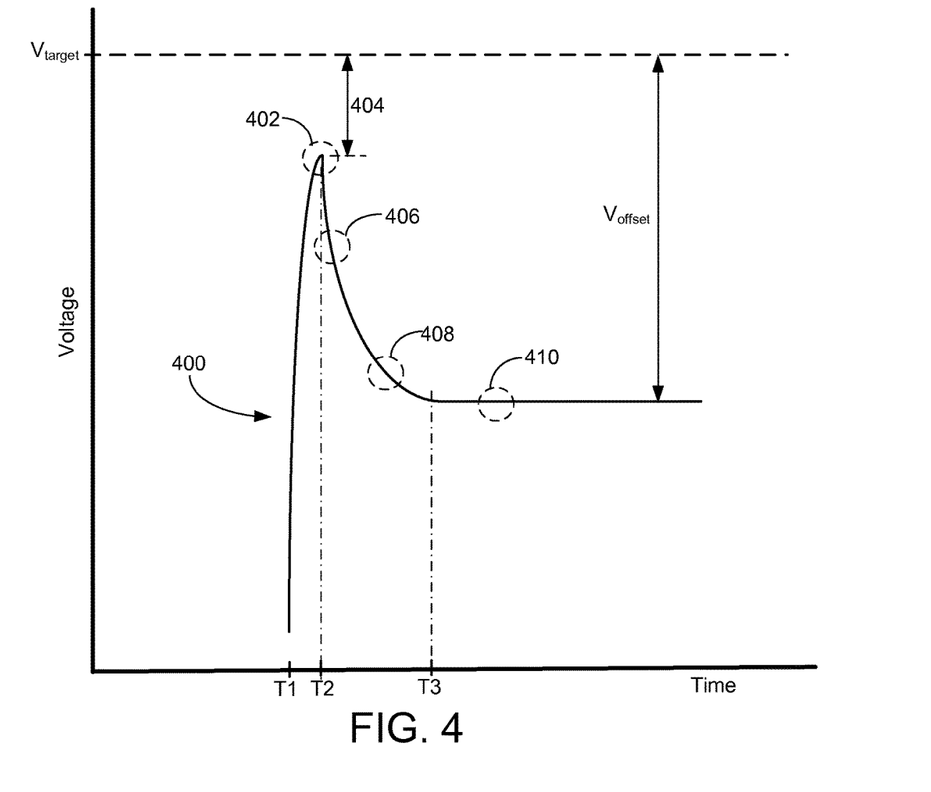
FIG. 4 is a plot of a portion of a reset voltage pulse as a function of time for an electrowetting pixel, according to various embodiments.

FIG. 4 is a plot of a portion of a reset pulse 400 as a function of time for a pixel of an electrowetting display device, according to various embodiments. For example, reset pulse 400 may be applied to pixel portion 302 by a reset controller (not illustrated). Reset pulse is, for example, a square pulse having a target amplitude of $V_{target}$ and a pulse width of about 1 millisecond. In such a case, a time span between T1 and T3 may be a small fraction of the pulse width, such as 10 microseconds, for example. The time span from T1 to T3 includes a transient response to the application of reset pulse 400. In the example illustrated, reset pulse 400 begins to be applied at time T1 and includes a rising edge to time T2. Subsequently, reset pulse decays (e.g., corresponding at least approximately to an RC (resistance-capacitance) time constant) from time T2 to time T3.

Various portions of reset pulse 400 are identified. Undercharge (e.g., which may occur in the word line(s)) effect tends to contribute to the voltage at portion 402. For example, intrinsic capacitances and resistances (e.g., Cpixel and Rel) in pixel portion 302 are associated with an RC time constant that affects the response of the pixel portion to applied reset pulse 400. One such effect is that reset pulse 400, with a target amplitude voltage, falls short of $V_{target}$ by a voltage difference 404.

Voltage kickback (e.g., based, at least in part, on intrinsic capacitances in pixel portion 302) effect tends to contribute to the voltage at portion 406. R-electrolyte effect, e.g. "Rel" in FIG. 3, tends to contribute to the voltage at portion 408. Pixel capacitance and TFT leakage (e.g., TFT 306) tends to contribute to the voltage at portion 410. For example, TFT 306 may experience drain-gate (D-G) and source-gate (S-G) current leakages and parasitic capacitances.

As a result of such effects, the steady-state amplitude of reset pulse 400 may be less than Vtarget by a voltage $V_{offset}$. For a numerical example, Vtarget may be about 10 volts and $V_{offset}$ may be about 3.6 volts, though claimed subject matter is not limited in this respect. Results of such effects may also vary for different electrowetting display devices (e.g., fabricated at different times or locations) and for different operating conditions. Thus, in some embodiments, a technique for dynamically adjusting electrical driving conditions may reduce effects from undercharge, voltage kickback, parasitic capacitances, and so on. The technique includes monitoring a voltage across a supplemental capacitor that electrically mimics the capacitive behavior of all the pixels on a particular gate line, as described below. The monitored voltage may be provided to a controller (e.g., feedback) that drives the pixels. The controller may modify how it drives the pixels based, at least in part, on the monitored voltage. Thus, for example, the monitored voltage may be below a threshold value, indicating that $V_{offset}$ is larger than desired (e.g., effects from undercharge, voltage kickback, and parasitic capacitances are pulling the reset voltage away from a desired target voltage $V_{target}$). The controller, receiving the monitored voltage, may subsequently reduce $V_{offset}$ by increasing the magnitude of the reset pulses applied to the pixels.

Figure 5:
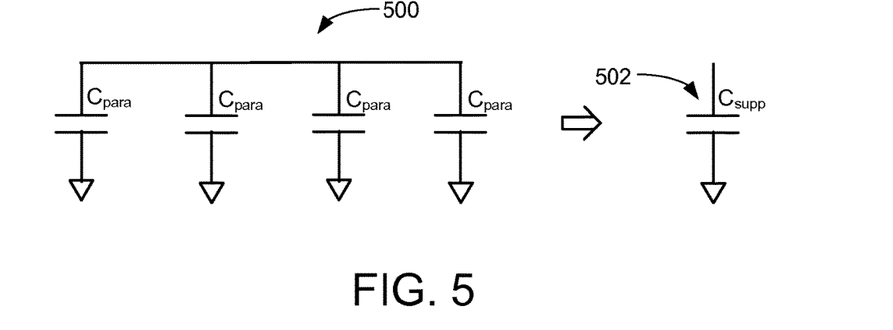
FIG. 5 illustrates a supplemental capacitor having an equivalent capacitance for parallel parasitic capacitances of pixels of a display device, according to various example embodiments.

FIG. 5 illustrates a supplemental capacitor having an equivalent capacitance for parallel parasitic capacitances of pixels of a display device, according to various example embodiments. For example, such pixels may be the same as or similar to pixel 100 illustrated in FIG. 1. In general, a number N of capacitors $C_{para}$ connected in a parallel configuration 500 have an equivalent capacitance Ceq given by the following relation: Ceq=$N*C_{para}$. Thus, for example, the equivalent capacitance of fifty interconnected pixels each having a total parasitic capacitance $C_{para}$ is Ceq=$50*C_{para}$. A supplemental capacitor 502 may be fabricated to have a capacitance $C_{supp}$ to be at least approximately equal to the equivalent capacitance Ceq of the parasitic capacitances of all pixels interconnected with one another on, for example, a gate line or other line (e.g., source line, and so on). As described below, such a supplemental capacitor, having a relatively large capacitance (as compared to parasitic capacitances of individual pixels) allows a voltage-measuring device to measure effects of the parasitic capacitances of the pixels by measuring the voltage across the supplemental capacitor.

Figure 6:
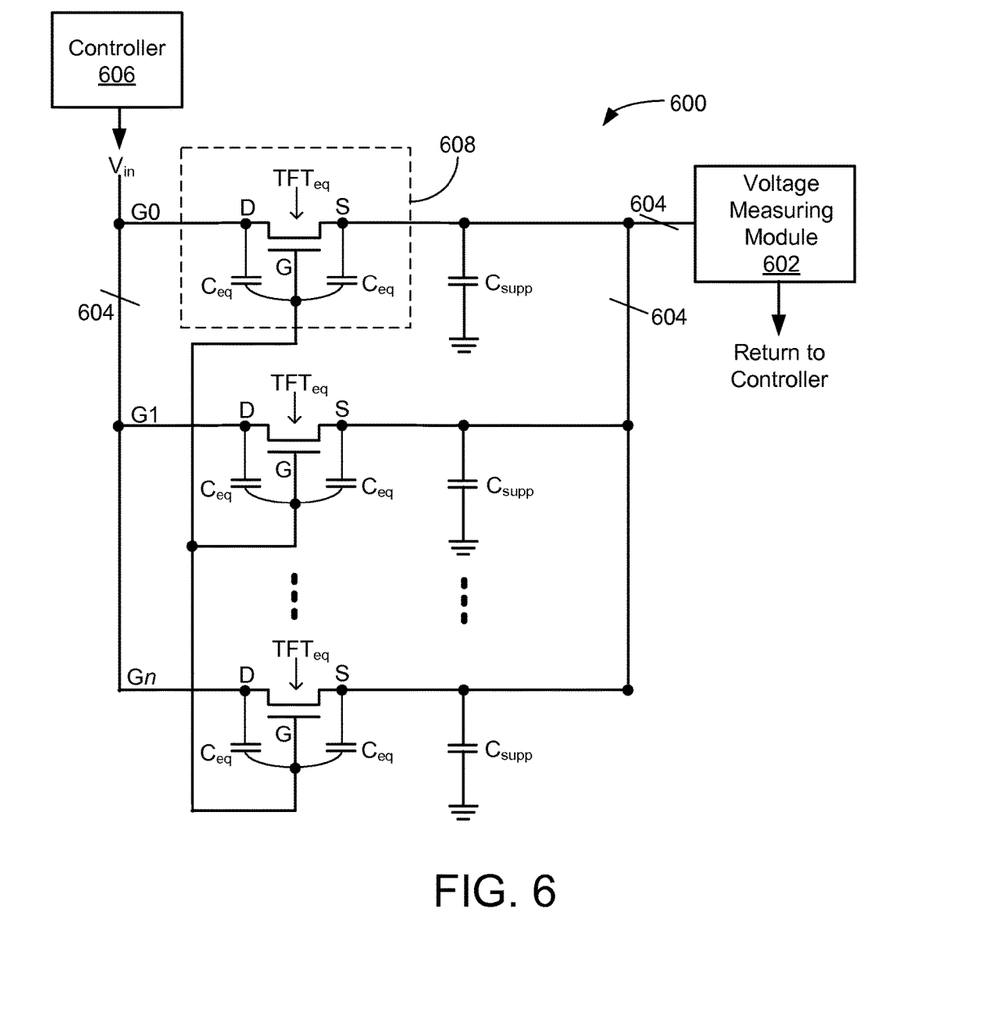
FIG. 6 is a schematic circuit diagram of a portion of an electrowetting pixel array of an electrowetting display device, according to various embodiments.

FIG. 6 is a schematic circuit diagram of a portion of a pixel array 600 and a voltage measuring module VMM 602 of an electrowetting display device, according to various embodiments. The electrowetting display device includes a plurality of pixels (not explicitly illustrated in FIG. 6) arranged in rows and columns of an array. For example, the electrowetting display device may include hundreds or thousands of such rows and columns of pixels, which may be similar to or the same as electrowetting elements 300 illustrated in FIG. 3. For sake of clarity, a storage capacitor of each electrowetting pixel, such as Cstorage illustrated in FIG. 3, is not included in FIG. 6. The pixels may be electrically connected in the array to gate lines G0, G1, G2, G3 . . . Gn, wherein n is an integer, and source lines (for sake of clarity, the source lines are not illustrated in FIG. 6).

Though the gate lines are illustrated as rows, the gate lines may instead be aligned in columns or any other configuration, and claimed subject matter is not so limited. The gate lines and source lines are electrically connected to a plurality of conductors (e.g., wires, conductive traces, and so on). A plurality of such conductors (but not all) is indicated by diagonal lines 604. Electrical signals (e.g., waveforms, voltage levels, and so on) are provided to the gate lines and source lines by a controller 606. In particular, the controller may provide reset pulses, such as reset pulse 400 illustrated in FIG. 4, to the pixels. As described above, amplitudes $V_{in}$ and/or other characteristics (e.g., pulse width, duty cycle, frequency, and so on) of such reset pulses may be based, at least in part, on voltages measured (e.g., by VMM 602) across supplemental capacitors on individual gate lines.

Controller 606 may be a processor, a CPU, or an ASIC, just to name a few examples. Functions of controller 606 may be implemented by software, hardware, or both. Controller 606 may affect optical transmission of the pixels by increasing or decreasing voltage on the source lines and by generating the reset signals, for example.

Though not explicitly illustrated in FIG. 6, each gate line G0, G1, . . . Gn may include a plurality of interconnected pixels, each having parasitic capacitances (e.g., such as $C_{TFT}$ illustrated in FIG. 3) between the gate and source and between the gate and drain of the TFT associated with each pixel (e.g., such as TFT 306). For example, referring to FIG. 3, the TFT of each pixel (e.g., pixel portion 302) on individual gate lines 308 may have such parasitic capacitances. Accordingly, for each gate line G0 G1, . . . Gn, the parasitic capacitances of all the pixels on the gate line may add to form an equivalent capacitance $C_{eq}$ between the gate and source and between the gate and drain of the TFT associated with each of the pixels. Such equivalent capacitances $C_{eq}$ are illustrated in a block 608 (illustrated for gate line G0) that schematically represents the equivalent TFT portion of all the pixels interconnected to one another of the individual gate lines. Additional blocks (though not illustrated) repeat for each gate line G1, . . . Gn.

In some embodiments, each gate line G0, G1, . . . Gn may include a supplemental capacitor $C_{supp}$ fabricated at some point or region along each gate line. As discussed above, voltage across such a supplemental capacitor may mimic the voltage across parasitic capacitances of the pixels interconnected with one another along each gate line. Thus, monitoring the voltage across the supplemental capacitor of a gate line may allow for determining (e.g., at least approximately) the voltage drop of a reset voltage applied to the pixels on the gate line due to parasitic effects of the pixels.

During fabrication of the electrowetting display device, the supplemental capacitor may be fabricated to have a capacitance to be at least approximately equal to the equivalent capacitance $C_{eq}$ of the parasitic capacitances of all the pixels on the individual gate lines. In some implementations, the values of such an equivalent capacitance $C_{eq}$ may be determined a priori by trial and error, experimentation, calculation, or an estimation, just to name a few example methods. Generally, physical properties (e.g., chemical structure, dimensions, etc.) of pixels may slightly vary for different pixels for different fabrication batches. Accordingly, the equivalent capacitance $C_{eq}$ need not be exactly determined for fabricating the supplemental capacitors. In some implementations, the capacitance of $C_{supp}$ and $C_{eq}$ may differ by up to 10 or 20%, just to name a particular numerical example. Of course, the closer such capacitances are to one another, the more accurately $C_{supp}$ can mimic the capacitive behavior of the pixels on the gate lines.

In some embodiments, the supplemental capacitors on each gate line may be the same as one another. In other embodiments, the supplemental capacitors on each gate line may be substantially different from one another. VMM 602 may be configured to separately measure the voltage across the supplemental capacitor of each gate line. For example, VMM 602 may measure the voltage across the supplemental capacitor on gate line G0, the voltage across the supplemental capacitor on gate line G1, the voltage across the supplemental capacitor on gate line G2, and so on in sequence or simultaneously. In some implementations, a controller may operate the array of pixels one gate line at a time. In this case, VMM 602 may measure the voltage across the supplemental capacitor of a particular gate line during the time when the controller is operating the particular gate line. In other implementations, a controller may operate the array of pixels by more than one gate line at a time. In this case, VMM 602 may measure the voltage across the supplemental capacitors of active gate lines during the time when the controller is operating the multiple gate lines. The gate lines may be connected to VMM 602 via a multiplexer, for example, though claimed subject matter is not limited in this respect.

In some embodiments, VMM 602 may provide electrical signals representative of voltage measurements of the supplemental capacitors to controller 606. Accordingly, the controller may adjust voltages of reset pulses and/or drive signals that the controller applies to the pixels. In particular, for example, the controller may adjust such voltages and/or drive signals for pixels that are on the gate line for which the controller received a supplemental capacitor voltage measurement. In a feedback type of process, as conditions of the electrowetting display device subsequently change (e.g., such as by extended period of use or environmental conditions that may affect temperature of the electrowetting display device), parasitic effects on the pixels may correspondingly change. In turn, the voltage drop of a reset voltage applied to the pixels may change. Such change may be detected by VMM 602 monitoring the voltage across the supplemental capacitors. VMM 602 provides signals based, at least in part, on such change to controller 606, which may consequently adjust reset voltages and/or driving signals accordingly.

Figure 7:
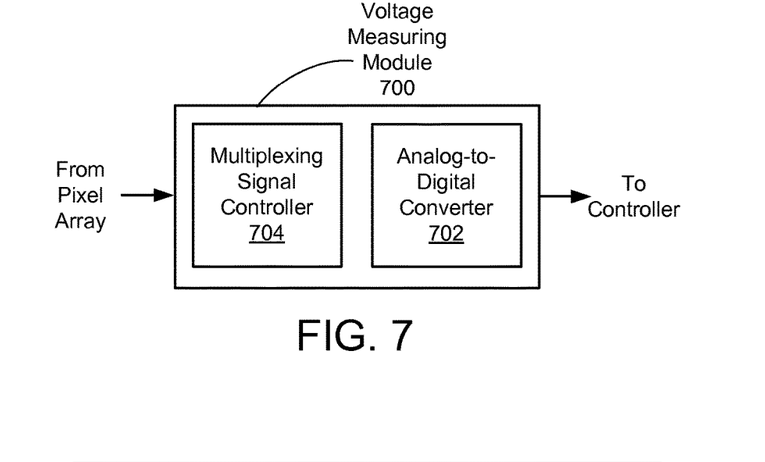
FIGS. 7 and 8 are block and schematic diagrams of a voltage measuring module for an electrowetting display device, according to various embodiments.

FIG. 7 is a block diagram of a VMM 700 for an electrowetting display device, according to various embodiments. For example, VMM 700 may be similar to or the same as VMM 602 illustrated in FIG. 6. VMM 700 may include an analog-to-digital converter (ADC) 702 and a multiplexing signal controller 704 for interfacing ADC 702 to one or more gate lines of an array of pixels. For example, such gate lines may be similar to or the same as gate lines G0, G1, . . . , Gn, illustrated in FIG. 6. VMM 700 is merely one example of a number of possible circuits to measure voltage of one or more supplemental capacitors so as to determine parasitic capacitance of pixels of the array.

Though illustrated as two separate blocks, ADC 702 and multiplexing signal controller 704 may be separate or single electrical circuits or multiple circuits in a single package, code executable by one or more processors, or any combination thereof. For example, multiplexing signal controller 704 may comprise logic circuitry and/or a processor for executing code.

In some implementations, ADC 702 has n input channels, where n is the number of gate lines in the pixel array. VMM 700 may control flow of data to a controller such as controller 606 illustrated in FIG. 6, for example. The data may comprise information regarding the voltage across supplemental capacitors on respective gate lines of the pixel array. As described above, using such data, the controller may adjust voltage values of reset pulses that are applied to pixels on the respective gate lines. VMM 700 may use multiplexing signal controller 704 to determine which gate line of the pixel array is being addressed.

Figure 8:
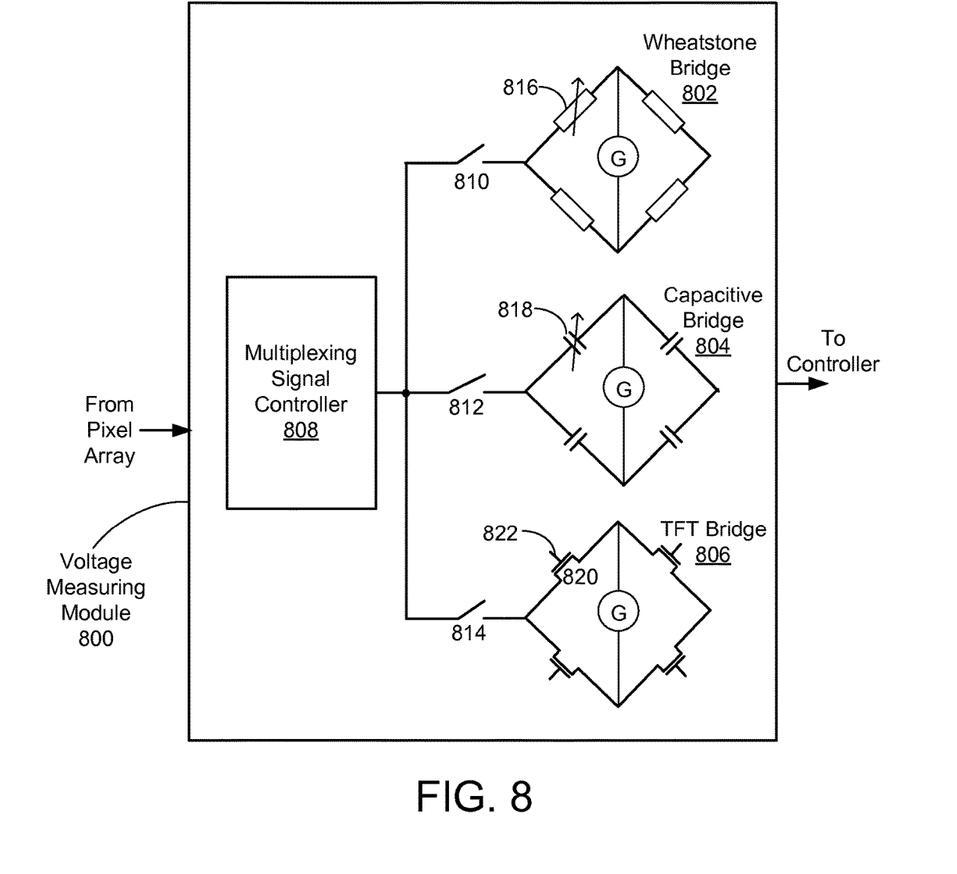

FIG. 8 is a schematic diagram of a VMM 800 for an electrowetting display device, according to various embodiments. For example, VMM 800 may be similar to or the same as VMM 602 illustrated in FIG. 6. VMM 800 may include a Wheatstone bridge circuit 802, a capacitive bridge circuit 804, and a TFT bridge circuit 806. A multiplexing signal controller 808 may be used by VMM 800 for interfacing the three bridge circuits to one or more gate lines of an array of pixels. For example, such gate lines may be similar to or the same as gate lines G0, G1, . . . , Gn, illustrated in FIG. 6. VMM 800 is merely one example of a number of possible circuits to measure voltage of one or more supplemental capacitors so as to determine parasitic capacitance of pixels of the array.

Though illustrated as separate configurations, Wheatstone bridge circuit 802, capacitive bridge circuit 804, TFT bridge circuit 806, and multiplexing signal controller 808 may be separate or single electrical circuits or multiple circuits in a single package, code executable by one or more processors, or any combination thereof. For example, multiplexing signal controller 808 may comprise logic circuitry and/or a processor for executing code. In some implementations, multiplexing signal controller 808 may comprise multiplexing and demultiplexing circuitry (not illustrated).

VMM 800 may be similar to VMM 700 except that VMM 800 uses bridge circuits in place of ADC 702, for example. In some implementations, gate lines of the pixel array are connected to one side of an n:1 multiplexer (n being the number of gate lines) of multiplexing signal controller 808. The other side of the n:1 multiplexer is connected to a 1:3 demultiplexer of multiplexing signal controller 808. Via switches 810, 812, and 814, respectively, the 1:3 demultiplexer switches among Wheatstone bridge 802, capacitive bridge 804, and TFT bridge 806.

Wheatstone bridge 802 includes a number of variable resistors 816 and capacitive bridge 804 includes a number of variable capacitors 818. TFT bridge 806 includes a number of TFTs 820 each having a gate line 822.

The center of each bridge may include a galvanometer G that measures electrical current passing through the bridge. Generally, if current passing through the bridge is measured by the galvanometer to be null, the bridge may be considered to be balanced. The bridges may be balanced by changing the resistance, capacitance, or gate voltage of one or more of the resistors, capacitors and/or transistors of a given bridge, respectively. In the case of Wheatstone bridge 802 or capacitive bridge 804, balancing may be performed by changing the resistance or capacitance of one or more of the resistors and capacitors of a given bridge, respectively. However, for balancing TFT bridge 806, one or more of the gates 822 of the TFTs 820 forming the gate have to be in equipotential, while only one of the gate voltages is varied. Adjustment voltage may then be substantially equal to the voltage drop (e.g., $V_{offset}$ in FIG. 4) due the parasitic effects in the elements of the array.

Once each bridge is substantially balanced and parasitic parameters associated with voltages across each supplemental capacitor, the capacitance of each supplemental capacitor, and the TFTs of each gate line are determined by VMM 800, values of such parasitic parameters may be provided to the controller, which may adjust voltage values of reset pulses that are applied to pixels on respective gate lines. VMM 800 may use multiplexing signal controller 808 to determine which gate line of the pixel array is being addressed.

Figure 9:
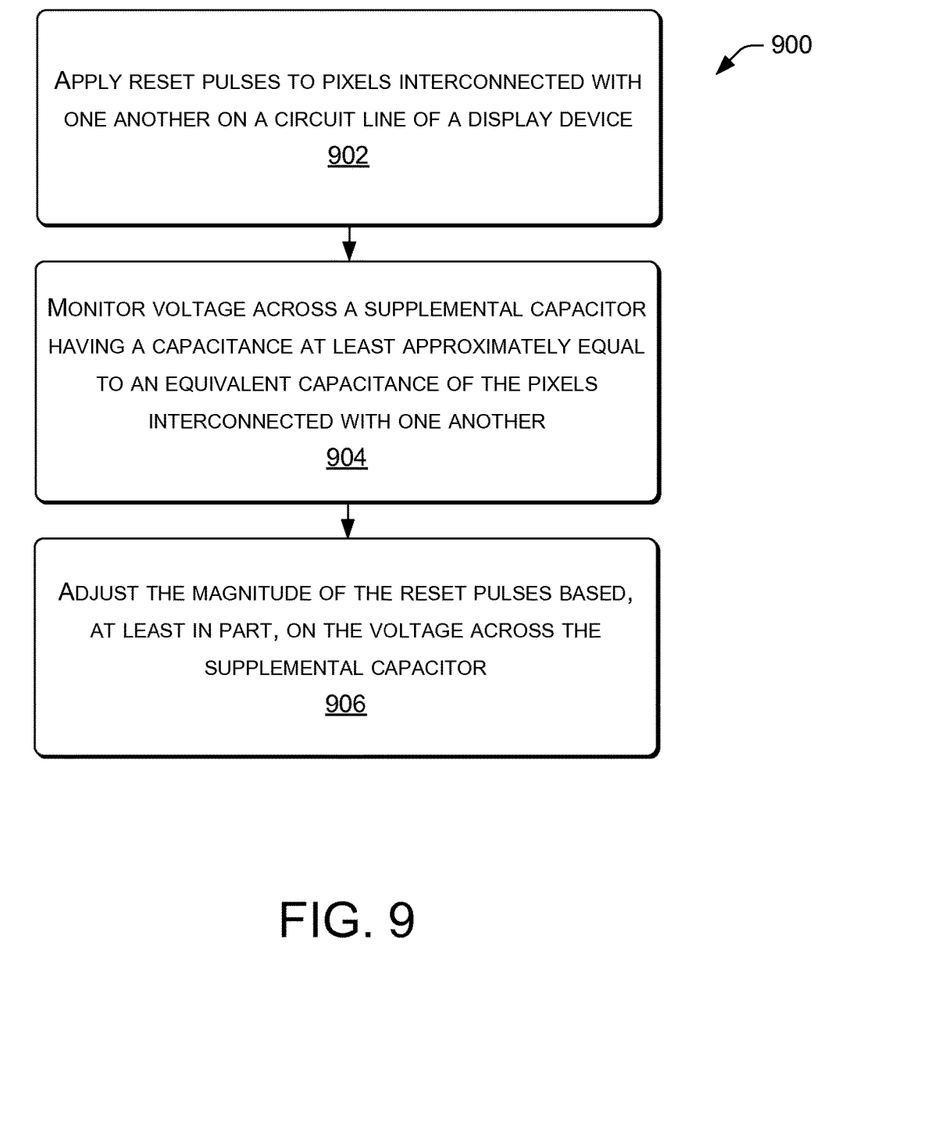
FIG. 9 is a flow diagram of a process for operating an electrowetting display device, according to various example embodiments.

FIG. 9 is a flow diagram of a process 900 for operating an electrowetting display device, according to various example embodiments. For example, such an electrowetting display device may include electrowetting elements such as 100 or 302 illustrated in FIGS. 1 and 3, respectively. Process 900 may be performed by a controller or one or more processors (e.g., controller 606 illustrated in FIG. 6 or processor(s) 1010, illustrated in FIG. 10), for example. Process 900 is described as being performed by controller 606, though claimed subject matter is not so limited.

At block 902, controller 606 applies (e.g., periodically) reset pulses to pixels interconnected with one another on a circuit line of a display device. Such a circuit line may comprise gate lines, such as G0, G1, . . . Gn, as illustrated in FIG. 6, for example.

At block 904, controller 606 may monitor voltage across a supplemental capacitor having a capacitance at least approximately equal to an equivalent capacitance of the pixels interconnected with one another. Monitoring the voltage across the supplemental capacitor may include operating an analog-to-digital converter to convert the voltage across the supplemental capacitor to a digital signal, and providing the digital signal to the controller that generates the reset pulses, though claimed subject matter is not limited in this respect.

At block 906, controller 606 may adjust the magnitude of the reset pulses based, at least in part, on the voltage across the supplemental capacitor. For example, the adjustment may be proportional to the digital signal. In some implementations, the controller may adjust other characteristics of the reset pulses, such as pulse width, frequency, duty cycle, and so on.

Figure 10:
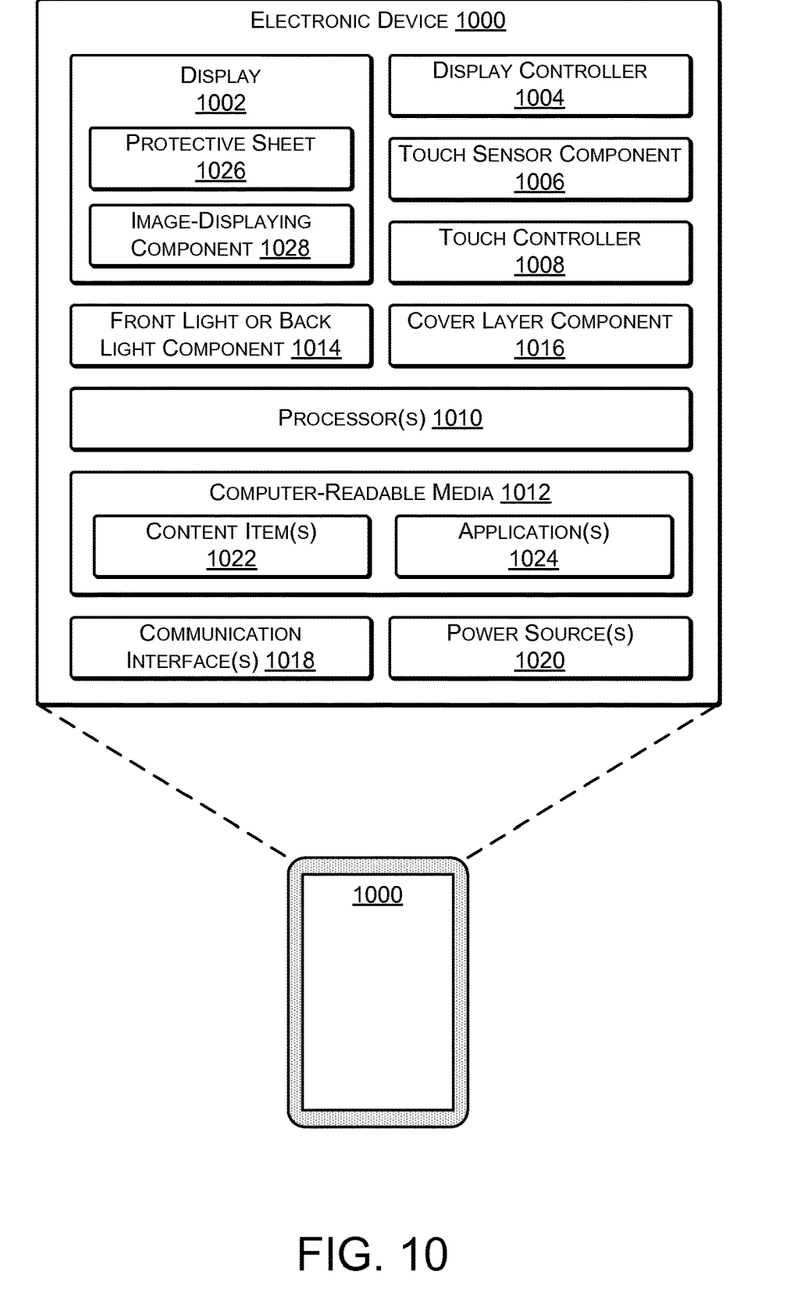
FIG. 10 illustrates an example electronic device that may incorporate a display device, according to some embodiments.

FIG. 10 illustrates an example electronic device 1000 that may incorporate any of the display devices discussed above. The device 1000 may comprise any type of electronic device having a display. For instance, the device 1000 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1000 may be a non-mobile electronic device (e.g., a computer display, a television, etc.). In addition, while FIG. 10 illustrates several example components of the electronic device 1000, it is to be appreciated that the device 1000 may also include other conventional components, such as an operating system, system busses, input/output components, and the like. Further, in other examples, such as in the case of a television or computer monitor, the electronic device 1000 may only include a subset of the components illustrated.

Regardless of the specific implementation of the electronic device 1000, the device 1000 includes a display 1002 and a corresponding display controller 1004. The display 1002 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even if very little or no power is supplied to the display. Some examples of the display 1002 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 1000, the display 1002 may be an active display such as a liquid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, transparent or transmissive/reflective (transflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1002 may represent a backlit display, examples of which are mentioned above.

In addition to including the display 1002, FIG. 10 illustrates that some examples of the device 1000 may include a touch sensor component 1006 and a touch controller 1008. In some instances, at least one touch sensor component 1006 resides with, or is stacked on, the display 1002 to form a touch-sensitive display (e.g., an electronic paper touch-sensitive display). Thus, the display 1002 may be capable of both accepting user touch input and rendering content in response to or corresponding to the touch input. As several examples, the touch sensor component 1006 may comprise a capacitive touch sensor, a force sensitive resistance (FSR), an interpolating force sensitive resistance (IFSR) sensor, or any other type of touch sensor. In some instances, the touch sensor component 1006 is capable of detecting touches as well as determining an amount of pressure or force of these touches.

FIG. 10 further illustrates that the electronic device 1000 may include one or more processors 1010 and one or more computer-readable media 1012, as well as a front light component 1014 (which may alternatively be a backlight component in the case of a backlit display) for lighting the display 1002, a cover layer component 1016, such as a cover glass or cover sheet, one or more communication interfaces 1018 and one or more power sources 1020. The communication interfaces 1018 may support both wired and wireless connection to various networks, such as cellular networks, radio, WiFi networks, short range networks (e.g., Bluetooth®), infrared (IR), and so forth.

Depending on the configuration of the electronic device 1000, the computer-readable media 1012 (and other computer-readable media described throughout) is an example of computer storage media and may include volatile and non-volatile memory. Thus, the computer-readable media 1012 may include, but is not limited to, RAM, ROM, EEPROM, flash memory, or other memory technology, or any other medium that may be used to store computer-readable instructions, programs, applications, media items, and/or data which may be accessed by the electronic device 1000.

The computer-readable media 1012 may be used to store any number of functional components that are executable on the processor 1010, as well as content items 1022 and applications 1024. Thus, the computer-readable media 1012 may include an operating system and a storage database to store one or more content items 1022, such as eBooks, audio books, songs, videos, still images, and the like. The computer-readable media 1012 of the electronic device 1000 may also store one or more content presentation applications to render content items on the device 1000. These content presentation applications may be implemented as various applications 1024 depending upon the content items 1022. For instance, the content presentation application may be an electronic book reader application for rending textual electronic books, an audio player for playing audio books or songs, a video player for playing video, and so forth.

In some instances, the electronic device 1000 may couple to a cover (not illustrated in FIG. 10) to protect the display (and other components in the display stack or display assembly) of the device 1000. In one example, the cover may include a back flap that covers a back portion of the device 1000 and a front flap that covers the display 1002 and the other components in the stack. The device 1000 and/or the cover may include a sensor (e.g., a Hall Effect sensor) to detect if the cover is open (i.e., if the front flap is not atop the display and other components). The sensor may send a signal to the front light component 1014 if the cover is open and, in response, the front light component 1014 may illuminate the display 1002. If the cover is closed, meanwhile, the front light component 1014 may receive a signal indicating that the cover has closed and, in response, the front light component 1014 may turn off.

Furthermore, the amount of light emitted by the front light component 1014 may vary. For instance, upon a user opening the cover, the light from the front light may gradually increase to its full illumination. In some instances, the device 1000 includes an ambient light sensor (not illustrated in FIG. 10) and the amount of illumination of the front light component 1014 may be based at least in part on the amount of ambient light detected by the ambient light sensor. For example, the front light component 1014 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1002 may vary depending on whether the front light component 1014 is on or off, or based on the amount of light provided by the front light component 1014. For instance, the electronic device 1000 may implement a larger default font or a greater contrast if the light is off compared to if the light is on. In some instances, the electronic device 1000 maintains, if the light is on, a contrast ratio for the display that is within a certain defined percentage of the contrast ratio if the light is off.

As described above, the touch sensor component 1006 may comprise a capacitive touch sensor that resides atop the display 1002. In some examples, the touch sensor component 1006 may be formed on or integrated with the cover layer component 1016. In other examples, the touch sensor component 1006 may be a separate component in the stack of the display assembly. The front light component 1014 may reside atop or below the touch sensor component 1006. In some instances, either the touch sensor component 1006 or the front light component 1014 is coupled to a top surface of a protective sheet 1026 of the display 1002. As one example, the front light component 1014 may include a lightguide sheet and a light source (not illustrated in FIG. 10). The lightguide sheet may comprise a substrate (e.g., a transparent thermoplastic such as PMMA or other acrylic), a layer of lacquer and multiple grating elements formed in the layer of lacquer that function to propagate light from the light source towards the display 1002, thus illuminating the display 1002.

The cover layer component 1016 may include a transparent substrate or sheet having an outer layer that functions to reduce at least one of glare or reflection of ambient light incident on the electronic device 1000. In some instances, the cover layer component 1016 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 1026 may include a similar UV-cured hard coating on the outer surface. The cover layer component 1016 may couple to another component or to the protective sheet 1026 of the display 1002. The cover layer component 1016 may, in some instances, also include a UV filter, a UV-absorbing dye, or the like, for protecting components lower in the stack from UV light incident on the electronic device 1000. In still other examples, the cover layer component 1016 may include a sheet of high-strength glass having an antiglare and/or antireflective coating.

The display 1002 includes the protective sheet 1026 overlying an image-displaying component 1028. For example, the display 1002 may be preassembled to have the protective sheet 1026 as an outer surface on the upper or image-viewing side of the display 1002. Accordingly, protective sheet 1026 may be integral with and may overlie the image-displaying component 1028. The protective sheet 1026 may be optically transparent to enable a user to view, through the protective sheet 1026, an image presented on the image-displaying component 1028 of the display 1002.

In some examples, the protective sheet 1026 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1026 may include a coating, such as the hard coating described above. For instance, the hard coating may be applied to the outer surface of the protective sheet 1026 before or after assembly of the protective sheet 1026 with the image-displaying component 1028 of the display 1002. In some examples, the hard coating may include a photoinitiator or other reactive species in its composition, such as for curing the hard coating on the protective sheet 1026. Furthermore, in some examples, the protective sheet 1026 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1026, thereby protecting the image-displaying component 1028 from UV light.

According to some implementations herein, one or more of the components discussed above may be coupled to the display 1002 using fluid optically-clear adhesive (LOCA). For example, suppose that the light guide portion of the front light component 1014 is to be coupled to the display 1002. The light guide may be coupled to the display 1002 by placing the LOCA on the outer or upper surface of the protective sheet 1026. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1014 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1014. In other implementations, the LOCA may be placed near a center of the protective sheet 1026, and pressed outwards towards a perimeter of the top surface of the protective sheet 1026 by placing the front light component 1014 on top of the LOCA. The LOCA may then be cured by directing UV light through the front light component 1014. As discussed above, and as discussed additionally below, various techniques, such as surface treatment of the protective sheet, may be used to prevent discoloration of the LOCA and/or the protective sheet 1026.

While FIG. 10 illustrates a few example components, the electronic device 1000 may have additional features or functionality. For example, the device 1000 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 1000 may reside remotely from the device 1000 in some implementations. In these implementations, the device 1000 may utilize the communication interfaces 1018 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A method for operating an electrowetting display device, the method comprising:
    applying a first reset pulse to a drain or a source of a thin film transistor (TFT) of at least one of a plurality of pixels interconnected with one another on a gate line of the electrowetting display device;
    measuring a voltage across a supplemental capacitor that is connected between the gate line and a ground of the electrowetting display device, wherein the supplemental capacitor has a capacitance approximately equal to an equivalent capacitance of parasitic capacitances of each of the plurality of pixels interconnected with one another on the gate line; and
    adding the voltage to a second reset pulse that is applied to the drain or the source of the at least one of the plurality of pixels.

2. The method of claim 1, further comprising:
    measuring electrical current flowing through a Wheatstone bridge circuit, wherein the electrical current is responsive to the voltage across the supplemental capacitor;
    determining the electrical current is substantially zero; and
    while the electrical current is substantially zero, providing the voltage across the supplemental capacitor to a processor for generation of the second reset pulse.

3. The method of claim 1, wherein the parasitic capacitances of each of the plurality of pixels are between at least one of (i) the gate line and the source of the TFT of each of the plurality of pixels or (ii) the gate line and the drain of the TFT of each of the plurality of pixels.

4. A method comprising:
    applying a reset pulse to a drain or a source of a thin film transistor (TFT) of each of pixels interconnected with one another on a circuit line of a display device;
    measuring voltage across a supplemental capacitor having a capacitance approximately equal to an equivalent capacitance of parasitic capacitances of the pixels interconnected with one another on the circuit line; and
    adjusting a magnitude of a subsequent reset pulse based, at least in part, on the voltage across the supplemental capacitor.

5. The method of claim 4, wherein the circuit line comprises a gate line, which is connected to additional pixels that are interconnected to one another in a series configuration, and wherein the series configuration is in parallel with the pixels interconnected with one another on the circuit line.

6. The method of claim 4, wherein measuring the voltage across the supplemental capacitor comprises:
    converting the voltage across the supplemental capacitor to a digital signal by using an analog-to-digital converter; and
    providing the digital signal to a processor for generation of the subsequent reset pulse.

7. The method of claim 6, wherein the processor modifies the subsequent reset pulse in proportion to the digital signal.

8. The method of claim 4, wherein measuring the voltage across the supplemental capacitor comprises:
    measuring electrical current flowing through a Wheatstone bridge circuit, wherein the electrical current is responsive to the voltage across the supplemental capacitor;
    determining the electrical current is substantially zero; and
    providing the voltage across the supplemental capacitor to a processor for generation of the subsequent reset pulse.

9. The method of claim 4, wherein the parasitic capacitance of each of the pixels is between a gate and the source of the TFT of each of the pixels.

10. The method of claim 4, wherein the display device comprises an electrowetting display device that comprises a hydrophobic layer portion and an oil disposed on the hydrophobic layer portion.

11. The method of claim 4, wherein the capacitance of the supplemental capacitor is substantially the same as the capacitance of a parallel combination of the pixels interconnected with one another on the circuit line.

12. The method of claim 4, wherein applying the reset pulse to the pixels interconnected with one another on the circuit line comprises applying the reset pulse to sources or drains of the TFTs of the pixels interconnected with one another on the circuit line from the circuit line of the display device.

13. The method of claim 4, wherein the subsequent reset pulse comprises a pulse having a width in a range of about 0.5 to about 2.0 milliseconds.

14. The method of claim 4, wherein the subsequent reset pulse comprises a square pulse.

* * * * *